(12) United States Patent
Ochiai et al.

(10) Patent No.: US 6,981,668 B2
(45) Date of Patent: Jan. 3, 2006

(54) DRAG ADJUSTMENT KNOB FOR A SPINNING REEL

(75) Inventors: Koji Ochiai, Sakai (JP); Kei Saito, Sakai (JP); Tomokazu Kitazaki, Osaka (JP)

(73) Assignee: Shimano Inc., Osaka (JP)

( * ) Notice: Subject to any disclaimer, the term of this patent is extended or adjusted under 35 U.S.C. 154(b) by 9 days.

(21) Appl. No.: 10/834,171

(22) Filed: Apr. 29, 2004

(65) Prior Publication Data

US 2004/0227027 A1  Nov. 18, 2004

(30) Foreign Application Priority Data

| May 15, 2003 | (JP) | ............................. 2003-137329 |
| May 21, 2003 | (JP) | ............................. 2003-143818 |
| Oct. 3, 2003 | (JP) | ............................. 2003-346035 |

(51) Int. Cl.
  *A01K 89/015* (2006.01)
(52) U.S. Cl. ..................... 242/246; 242/303
(58) Field of Classification Search ............ 242/246, 242/245, 303
  See application file for complete search history.

(56) References Cited

U.S. PATENT DOCUMENTS

| 5,149,008 | A | * | 9/1992 | Oi | ............................. 242/246 |
| 5,259,565 | A | * | 11/1993 | Hitomi | ........................ 242/245 |
| 5,348,245 | A | * | 9/1994 | Sugawara | .................... 242/246 |
| 5,544,832 | A | * | 8/1996 | Okamoto | ..................... 242/245 |
| 5,947,400 | A | * | 9/1999 | Tsutsumi | .................... 242/322 |
| 6,641,069 | B2 | * | 11/2003 | Katayama et al. | .......... 242/246 |

FOREIGN PATENT DOCUMENTS

JP  6-29032  8/1994

* cited by examiner

Primary Examiner—Emmanuel M Marcelo
(74) Attorney, Agent, or Firm—Shinjyu Global IP Counselors, LLP

(57) ABSTRACT

Drag adjustment knob adjusts the braking force applied to a spool mounted on a spool shaft that has a single-thread first male screw on its front end. The drag adjustment knob includes first and second adjustment units, a transmission unit, and a pressing unit. The first adjustment unit includes a first female screw that screws onto the first male screw. The transmission unit is non-rotatably but axially movably mounted onto the spool shaft to be in contact with the first adjustment unit, and includes a multi-thread second male screw. The second adjustment unit includes a second female screw, which screws onto the second male screw and has a greater screw lead than that of the first female screw. The pressing unit is disposed between the second adjustment unit and the drag mechanism so as to come into contact with both, and is non-rotatable but axially movable with the spool shaft.

30 Claims, 10 Drawing Sheets

DRAG ADJUSTMENT KNOB FOR A SPINNING REEL

BACKGROUND OF THE INVENTION

Field of the Invention

The present invention relates to a drag adjustment knob. More specifically, the present invention relates to a drag adjustment knob for a spinning reel that adjusts the drag force of a drag mechanism that brakes a spool rotatably mounted on a spool shaft, the spool shaft being movable forward and backward with respect to a reel unit of the spinning reel and having a first screw on its front end, the spool being rotatably mounted to the spool shaft while being restricted from moving rearward.

One type of conventional drag adjustment knob that adjusts the drag force of a front drag mechanism provided on a spool of a spinning reel includes a first adjustment unit that sets the initial drag force, and a second adjustment unit that adjusts the drag force to be higher than the initial drag force (see, for example, Japanese Utility Model Application Publication No. H06-29032, FIGS. 8 and 10). The first adjustment unit is used to set the minimum initial drag force, e.g., the force at which the fishing line will not snap. The first adjustment unit is screwed onto a male screw formed at the front end of a spool shaft. The second adjustment unit includes an operating portion that is arranged outward in the radial direction of the first adjustment unit, and which screws onto a transmission member non-rotatably mounted on the spool shaft. Forward movement of the transmission member is restricted by the first adjustment unit. The second adjustment unit is in contact with the drag mechanism, and can set the drag force to be higher than the initial drag force. The screw pitch of both adjustment units is set to be the same or different.

In a conventional drag adjustment knob having this type of configuration, the initial load of the drag force is set by rotating the first adjustment unit. Then, with the initial drag force set, the drag force can be increased from the initial drag force by the second adjustment unit. This allows one to prevent a fish from escaping and the fishing line from breaking due to the drag force being set to a level lower than necessary.

With a conventional drag adjustment knob having the two aforementioned adjustment units, by increasing the screw pitch of the second adjustment unit so as to be larger than that of the first adjustment unit, the percentage increase in the drag force with respect to the amount of rotation of the second adjustment unit can enlarged, and thus the desired drag force can be quickly set. However, if the screw pitch is too large, the number of engaged screw threads will be reduced and the strength of the screw will be compromised. Because of this, with the aforementioned conventional configuration, there may be damage to the screws when a large drag force is set.

In view of the above, it will be apparent to those skilled in the art from this disclosure that there exists a need for an improved drag adjustment knob for a spinning reel that overcomes the above-described problems. This invention addresses this need in the art as well as other needs, which will become apparent to those skilled in the art from this disclosure.

SUMMARY OF THE INVENTION

It is an object of the present invention to make it possible to both maintain the strength of the screws and quickly set a desired drag force with a drag adjustment knob that includes two adjustment units.

A drag adjustment knob for a spinning reel according to the first aspect of the present invention adjusts a drag force of a drag mechanism that brakes a spool. The spool is rotatably mounted such that a rearward movement of the spool relative to the spool shaft is restricted. The spool shaft is movable forward and backward with respect to a reel unit of the spinning reel and has a first male screw portion formed on its front end. The drag adjustment knob includes a first adjustment unit, a transmission unit, a second transmission unit, and a pressing unit. The first adjustment unit includes a first female screw portion that is adapted to screw onto the first male screw portion. The transmission unit is adapted to be non-rotatably but axially movably mounted on the spool shaft so as to be in contact with a rear of the first adjustment unit, the transmission unit having a second male screw portion. The second adjustment unit includes a second female screw portion that screws onto the second male screw portion. The pressing unit is disposed between the second adjustment unit and the drag mechanism so that it can come into contact with both the second adjustment unit and the drag mechanism. The pressing unit is non-rotatable with respect to the spool shaft but movable in the axial direction. The number of threads of one of the first and second female screw portions that has a greater screw lead is greater than that of the other of the first and second female screw portions.

With this drag adjustment knob, the initial drag is adjusted with one of the first adjustment unit and second adjustment unit that has a screw portion with a smaller number of threads, for instance, a single thread screws with s small screw lead. For example, if the first female screw portion of the first adjustment unit is a single thread screw, the first adjustment unit will be rotated to adjust the initial drag. When the first adjustment unit is rotated in a direction in which the screw is tightened, the portion of the first adjustment unit that screws onto at least the first male screw moves rearward with respect to the spool shaft. When this occurs, the second adjustment unit is pressed via the transmission unit, the drag mechanism is pressed via the pressing unit, and the drag force of the drag mechanism increases. When the first adjustment unit is rotated in the opposite direction, the drag force will be reduced. When the second adjustment unit that has a female screw portion with a large screw lead, such as a multi-thread screw, is rotated in the tightening direction after the initial drag is set, then at least the second female screw portion of the second adjustment unit will move rearward with respect to the transmission unit. Then, the drag mechanism will be pressed via the pressing unit, and the drag force of the drag mechanism will gradually increase from the initial drag.

The same is true even when the first adjustment unit is the one that has a multi-thread screw. In this situation, when the second adjustment unit is rotated, the second female screw portion of the second adjustment unit moves rearward with respect to the transmission member with the transmission member in contact with the first adjustment unit, the drag mechanism is pressed via the pressing unit, and the drag force can be set to the desired initial drag. When the multi-thread screw portion of the first adjustment unit is rotated in this state, the pressing unit is pressed rearward via the second adjustment unit, and the drag force is gradually increased from the initial drag force.

Here, even if a multi-thread screw portion is employed in one adjustment unit and a single thread screw portion that has the same pitch as that of the multi-thread screw portion is employed in another adjustment unit, the amount of rearward movement (screw lead) with respect to the amount of rotation of the adjustment unit that employs the multi-thread screw portion will be several times greater than the amount of rearward movement (screw lead) of the adjustment unit that employs single thread screw portion. Moreover, it is also possible to make both the pitch and the number of threads being engaged the same in both the single thread screw portion and the multi-thread screw portion. Accordingly, there will no longer be any need to increase the screw pitch, and the strength of the screws can be maintained and the desired drag force can be quickly set.

The drag adjustment knob for a spinning reel according to the second aspect of the present invention is the drag adjustment knob disclosed in the first aspect, in which the one of the first and female screw portions that has a larger screw lead also has a larger pitch. With this configuration, the amount of movement with respect to the amount of rotation of the adjustment unit can be further increased, and the desired drag force can be set more quickly, because the pitch of the screw portion is also large.

The drag adjustment knob for a spinning reel according to the third aspect of the present invention is the drag adjustment knob disclosed in the first or second aspect, in which the second female screw portion is a double thread screw, while the first female screw portion is a single thread screw. With this configuration, the second female screw portion can be inexpensively manufactured because it is a double thread screw, which can be manufactured relatively easily.

The drag adjustment knob for a spinning reel according to the fourth aspect of the present invention is the drag adjustment knob disclosed in any of the first through third aspects, in which the second adjustment unit further includes a cover portion. The cover portion covers and partially exposes the first adjustment unit. With this configuration, by partially covering the front end portion of the first adjustment unit, it will be difficult for fishing line to become snagged even if the first adjustment unit has a projection that projects outward. In addition, the second adjustment unit includes a cover portion that covers the periphery of the first adjustment unit while allowing operation of the first adjustment unit. Therefore, the first adjustment unit does not rotate due to a foreign matter that contacts or collide against the first adjustment unit. Accordingly, it is unlikely that the first adjustment unit of the drag adjustment knob according to the present aspect of the invention, which has two adjustment units, to rotate inadvertently.

The drag adjustment knob for a spinning reel according to the fifth aspect of the present invention is the drag adjustment knob disclosed in the fourth aspect, in which the second adjustment unit further includes a bridge portion that partially covers a front end of the first adjustment unit. By covering the front end of the first adjustment unit, it will be even more difficult for fishing line to become snagged, even where the first adjustment unit has a projection.

The drag adjustment knob for a spinning reel according to the fifth aspect of the present invention is the drag adjustment knob disclosed in any of the first through fifth aspects, in which the cover portion includes a tubular cover body portion that covers a periphery of the first adjustment unit, and a pair of cut-out portions that are formed on opposing positions on the tubular cover body portion and partially expose the periphery of the first adjustment unit. In this case, the fisherman can operate the first adjustment unit by pinching the cut-out portions, which are formed on opposing positions on the tubular cover body member, with two of his fingers.

In addition, because the periphery of the first adjustment unit is partially covered and partially exposed, it will be possible to operate the first adjustment unit with the exposed portion. In such cases, it will be even more difficult for fishing line to become snagged on the first adjustment unit.

The drag adjustment knob for a spinning reel according to the seventh aspect of the present invention is the drag adjustment knob disclosed in any of the first through sixth aspects, further including a first retaining portion that retains the transmission unit to the first adjustment unit so that the transmission unit is relatively rotatable with the first adjustment unit. With this configuration, the transmission unit and the first adjustment unit will not become separated from each other when the drag adjustment knob is removed, because the transmission unit is retained to the first adjustment unit by the first retaining portion.

The drag adjustment knob for a spinning reel according to the eighth aspect of the present invention is the knob disclosed in the seventh aspect, in which the first adjustment unit includes a tubular first adjustment unit body and a nut member. The tubular first adjustment unit body has a circular first recess formed to open on a rear end surface of the first adjustment unit body, and a plurality of engagement grooves that are formed along the axial direction on a front end surface spaced apart in a circular shape to be partially connected to the. The nut member has a first female screw and is mounted in the first recess of the first adjustment unit body such that the nut member is non-rotatable relative to the first adjustment unit body and forward movement of the nut relative to the first adjustment unit body is restricted. The transmission unit includes a first brim portion that is accommodated in the first recess. The first retaining portion is an elastic spring member that is mounted to the first recess in order to retain the transmission unit, and includes a plurality of engagement portions that are engaged in the plurality of engagement grooves, and contact portions that are unitarily formed with the engagement portions and contact the first brim portion of the transmission unit.

With this configuration, the first brim portion of the transmission unit is accommodated in the first recess of the first adjustment unit from the opening side thereof, the first retaining portion is then placed inside the first recess from the opening side while compressing the first retaining portion so that it can pass through the opening, and the compression is released after positioning the engagement portions of the first retaining portion in the engagement grooves formed in the outer edge portion of the first recess. When this occurs, the bottom surfaces of the engagement grooves produce engage the engagement portion s of the first retaining portion. Accordingly, the first retaining portion is prevented from moving towards the opening of the first recess of the first adjustment unit body. In addition, the contact portions are in contact with the opening side of the transmission unit, which is inserted into the first recess. Thus, the transmission unit will also not be able to move toward the opening of the first recess. Because of this, the transmission unit is retained within the first recess of the first adjustment unit body. The engagement grooves can be formed by die-casting because they are formed from the front end surface towards the rear end surface. Here, because the structure that serves to engage with the first retaining portion can be formed by die-casting, the engagement structure of the first retaining portion can be achieved without machining and thus manufacturing costs can be reduced.

The drag adjustment knob for a spinning reel according to the ninth aspect of the present invention is the drag adjustment knob disclosed in any of the first through eighth aspects, further including a second retaining portion that retains the pressing unit to the second adjustment unit so that the pressing unit is rotatable relative to the second retaining portion. With this configuration, when the first adjustment unit is loosened and removed from the spool shaft, it is possible to remove the entire drag adjustment knob without having to take it apart because the pressing unit is retained in the second adjustment unit.

The drag adjustment knob for a spinning reel according to the tenth aspect of the present invention is the drag adjustment knob disclosed in the ninth aspect, in which the second adjustment unit includes a cover portion having a second recess that is open on a rear end surface of the cover portion. The pressing unit includes a second brim portion that is accommodated in the second recess. The second retaining member is a screw member that engages the second brim portion and is screwed onto the second adjustment unit. With this configuration, the head portion of the screw member can be used to rotatably engage the pressing unit in a simple manner.

The drag adjustment knob for a spinning reel according to the eleventh aspect of the present invention is the drag adjustment knob disclosed in any of the first through tenth aspects, further including a first sound generating portion that generates sound through relative rotation between the first adjustment unit and the transmission unit. With this configuration, the operation of the first adjustment unit can be clearly recognized.

The drag adjustment knob for a spinning reel according to the twelfth aspect of the present invention is the drag adjustment knob disclosed in any of the first through eleventh aspects, further including a second sound generating portion that generates sound through relative rotation between the second adjustment unit and the pressing unit. With this configuration, the operation of the second adjustment unit can be clearly recognized.

The drag adjustment knob for a spinning reel according to the thirteenth aspect of the present invention is the knob disclosed in the twelfth aspect, in which the first sound generating portion generates clicking sounds having a finer pitch that those generated by the second sound generating portion. With this configuration, the adjustment units can be distinguished from each other during operation due to different intervals of the sounds generated by the first and second sound generating portions.

The drag adjustment knob for a spinning reel according to the fourteenth aspect of the present invention is the knob disclosed in any of the first through thirteenth aspects, in which one of the first and second adjustment units that has a screw with larger leads has a range of rotation that is limited to less than 360 degrees. With this configuration, the range of forward and backward movement of the adjustment unit that has a larger amount of forward and backward movement in one rotation (screw lead) can be limited, and thus changing the drag force to a set value can be simplified.

The drag adjustment knob for a spinning reel according to the fifteenth aspect of the present invention is the knob disclosed in any of the first through fourteenth aspects, in which the first female screw portion is a double thread screw, while the second female screw portion is a single thread screw.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
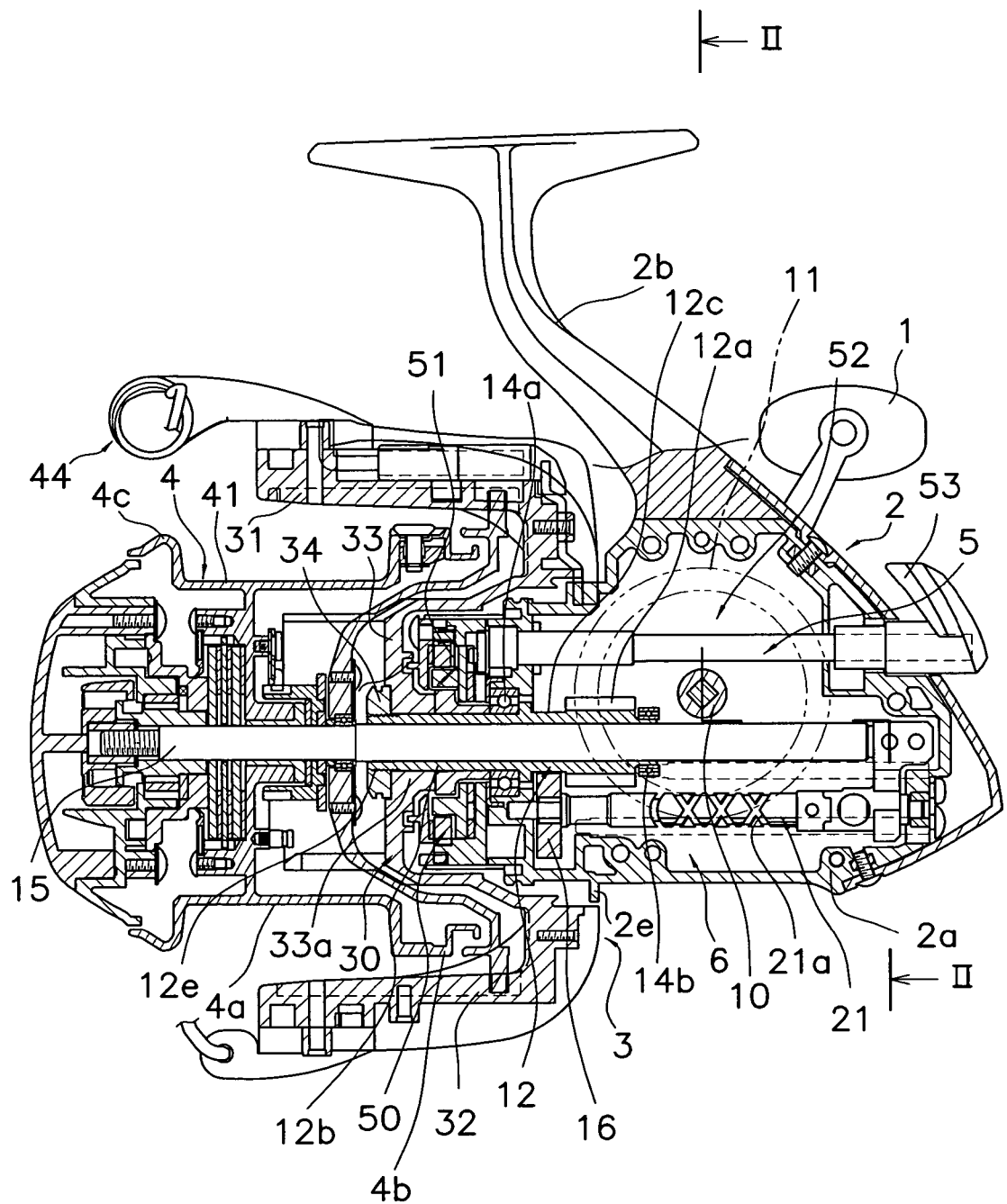
FIG. 1 is a left side cross-sectional view of a spinning reel according to one embodiment of the present invention.

As shown in FIG. 1, a spinning reel in accordance with an embodiment of the present invention includes a handle 1, a reel unit 2 that rotatably supports the handle 1, a rotor 3, and a spool 4. The rotor 3 is rotatably supported on the front of the reel unit 2. The spool 4 has fishing line wound around the outer peripheral surface thereof, and is supported on the front of the rotor 3 so that it can be moved forward and backward.

Figure 2:
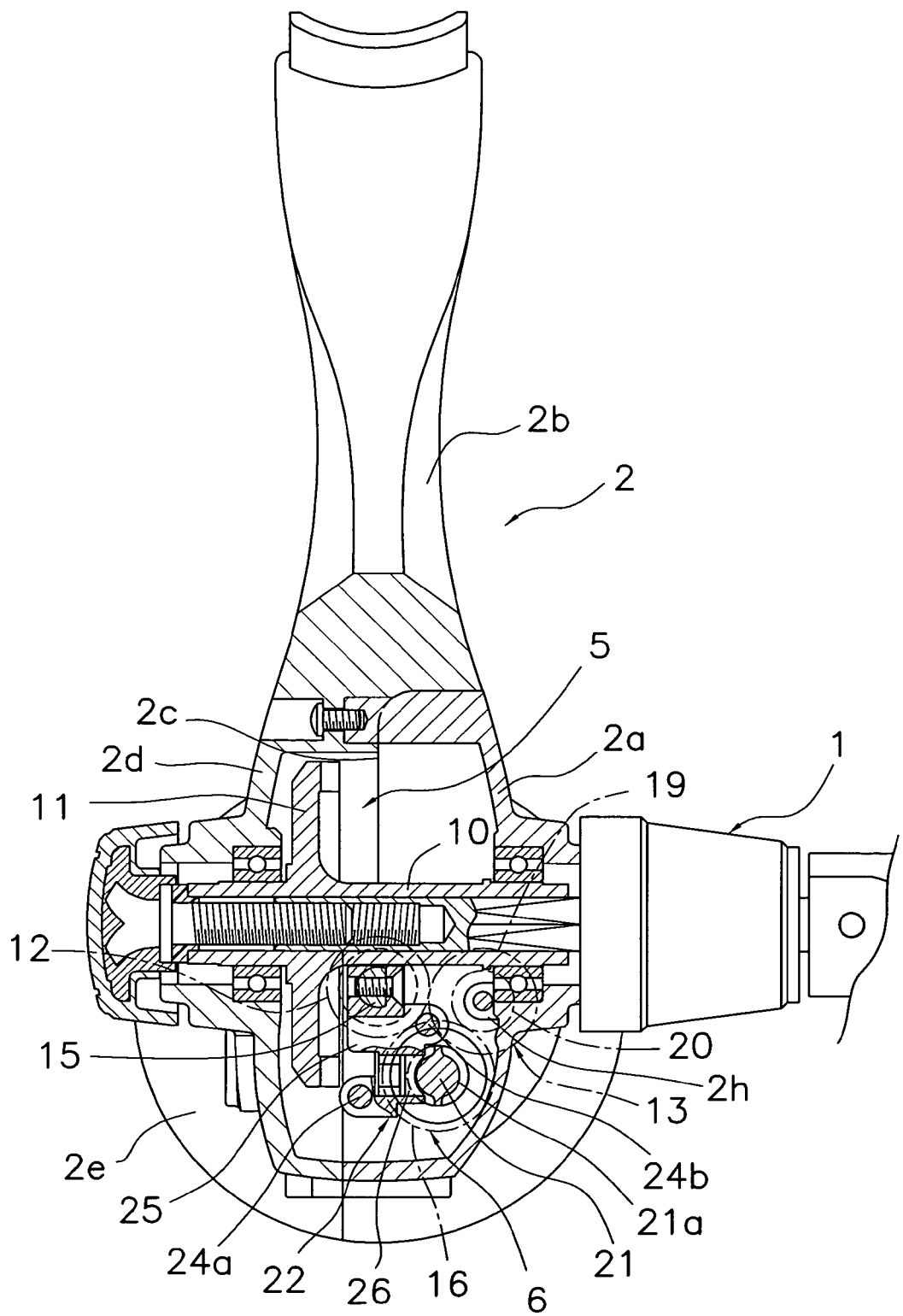
FIG. 2 is a cross-sectional of view the spinning reel according to the embodiment of the present invention taken along line II—II in FIG. 1.

As shown in FIGS. 1 and 2, the reel unit 2 includes a reel body 2a having an opening 2c on a side portion thereof, a lid 2d that serves to close the opening 2c in the reel body 2a, and a T-shaped rod attachment leg 2b that is formed unitarily with the lid 2d and extends diagonally upward and frontward.

The reel body 2a includes a space in the interior thereof. A rotor drive mechanism 5 that rotates the rotor 3 in association with the rotation of the handle 1, and an oscillating mechanism 6 that serves to move the spool 4 forward and backward to uniformly wind fishing line thereon, are arranged inside this space.

A circular flange portion 2e is formed with a front portion of the reel body 2a and the lid 2d, so as to cover the rear of the rotor 3. A circular wall 2g is formed on the rear of the flange portion 2e on the reel body 2a side, and a circular space is formed on the rear of the wall 2g.

Configuration of the Rotor 3

As shown in FIG. 1, the rotor 3 includes a cylindrical portion 30 that is open on the rear end thereof, and a first rotor arm 31 and a second rotor arm 32 that are respectively arranged opposite one another on the sides of the cylindrical portion 30. The cylindrical portion 30, the first rotor arm 31, and the second rotor arm 32 are unitarily formed as a one piece member.

The cylindrical portion 30 is disposed on the outer peripheral side of the flange portion 2e of the reel body 2a. The open rear portion of the cylindrical portion 30 is covered by the flange portion 2e. A front wall 33 is formed on the front of the cylindrical portion 30, and a boss 33a is formed in the central portion of the front wall 33. A male threaded portion 12e of the pinion gear 12 and the spool shaft 15 pass through the through hole in the boss 33a. A nut 34 is disposed at the front of the front wall 33, and this nut 34 screws onto the male threaded portion 12e on the front end of the pinion gear 12 to fix the rotor 3 to the pinion gear 12.

A bail arm 44 that serves to guide fishing line to the spool 4 is mounted to the front ends of the first rotor arm 31 and the second rotor arm 32 so as to be pivotable between a line winding posture and a line releasing posture.

A reverse rotation check mechanism 50 of the rotor 3 is disposed inside the space on the front side of the wall 2g of the cylindrical portion 30 of the rotor 3. The reverse rotation prevention mechanism 50 includes a roller-type one-way clutch 51, and a control mechanism 52 for switching the one-way clutch 51 between an operating state and a non-operating state. The one-way clutch 51 has an outer ring fixed to the reel body 2a, and an inner ring non-rotatably mounted to the pinion gear 12. The control mechanism 52 includes a control lever 53 disposed on the rear of the reel body 2a, and the one-way clutch 51 is switched between its two states by pivoting the control lever 53. In the operational state, the rotor 3 cannot rotate in the reverse direction, and in the non-operational state, the rotor 3 can rotate in the reverse direction.

Rotors are conventional components that are well-known in the art. Accordingly, the rotor 3 will not be explained or illustrated in further details herein.

Configuration of the Rotor Drive Mechanism 5

As shown in FIGS. 1 and 2, the rotor drive mechanism 5 includes a main gear shaft 10 on which the handle 1 is non-rotatably mounted, a main gear 11 (a face gear) that rotates together with the main gear shaft 10, and the pinion gear 12 that meshes with the main gear 11.

Figure 3:
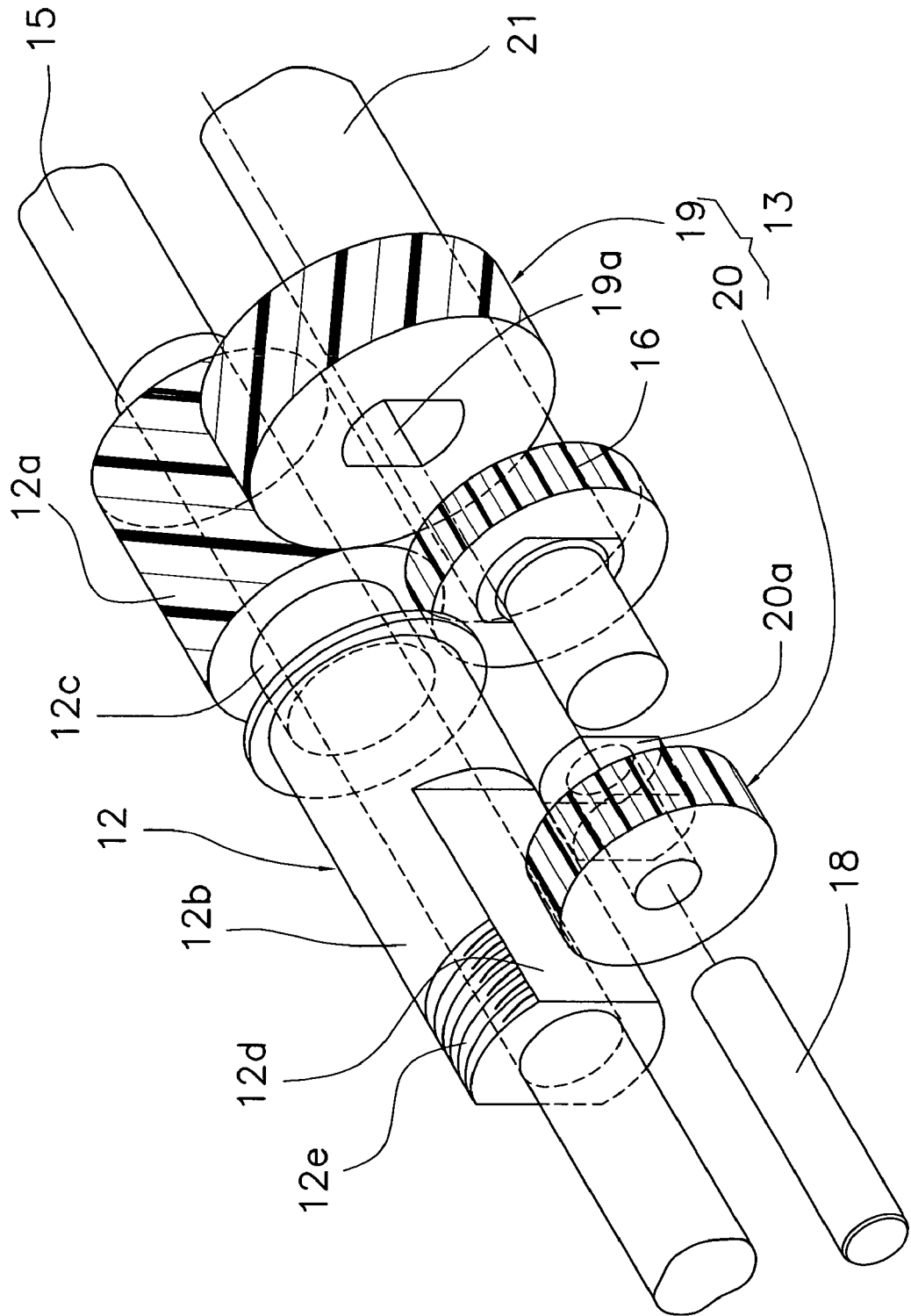
FIG. 3 is a perspective view of an oscillating mechanism of the spinning reel according to the embodiment of the present invention.
Figure 4:
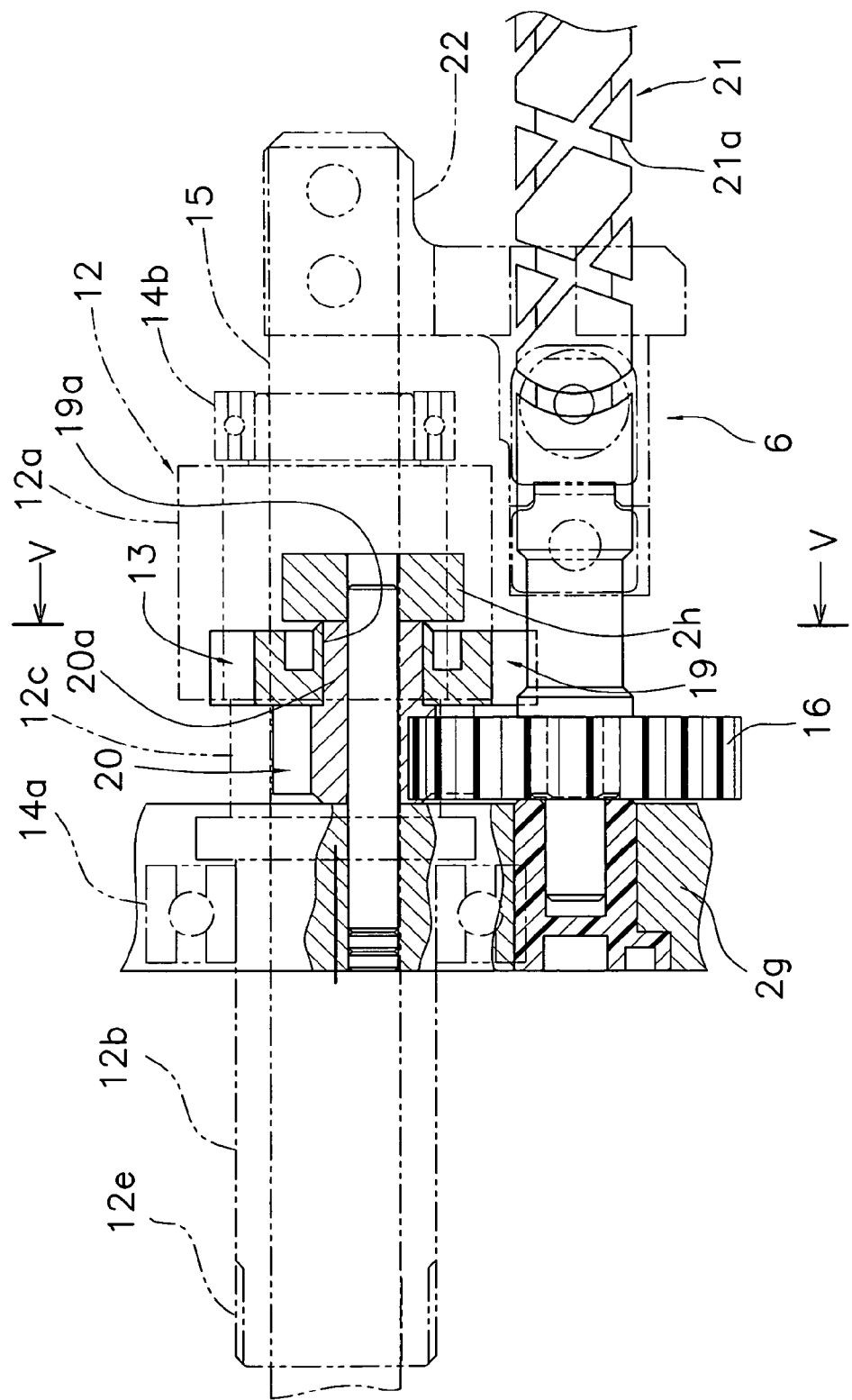
FIG. 4 is a partial longitudinal cross-sectional view of the oscillating mechanism of the spinning reel according to the embodiment of the present invention.

The pinion gear 12 is rotatably mounted on the reel body 2a so that the pinion gear 12 rotates in a different direction from that of the main gear 11. As shown in FIGS. 3 and 4, the pinion gear 12 is a tubular member that rotates in association with the handle 1 and the spool shaft 15 that extends from front to rear and passes through the central portion of the pinion gear 12. The pinion gear 12 includes a gear portion 12a that meshes with the main gear 11 and a large diameter gear 19 (described below), a tubular portion 12b that is formed on the front end side of the gear portion 12a, and a cut-out portion 12c that is disposed forward of the gear portion 12a in the axial direction (left side in FIG. 4) and formed to have a diameter that is smaller than that of the gear portion 12a. The tubular portion 12b and the rear side of the gear portion 12a of the pinion gear 12 are rotatably supported on the reel body 2a via bearings 14a and 14b. The gear portion 12a is a crossed helical gear that meshes with the main gear 11 (the face gear). Parallel chamfered portions 12d and a male threaded portion 12e are formed on the front end of the tubular portion 12b. The rotor 3 is non-rotatably mounted on the chamfered portions 12d, and the rotor 3 is fixedly coupled to the front end of the tubular portion 12b of the pinion gear 12 by a nut 34 that screws onto the male threaded portion 12e. The cut-out portion 12c is an annular groove that is formed in the circumferential direction, and the axial length of the groove is longer than the axial length of the gear portion of a driven gear 16 (described below).

Rotor drive mechanisms are conventional components that are well-known in the art. Accordingly, the rotor drive mechanism 5 will not be explained or illustrated in further details herein.

Configuration of the Oscillating Mechanism 6

Figure 5:
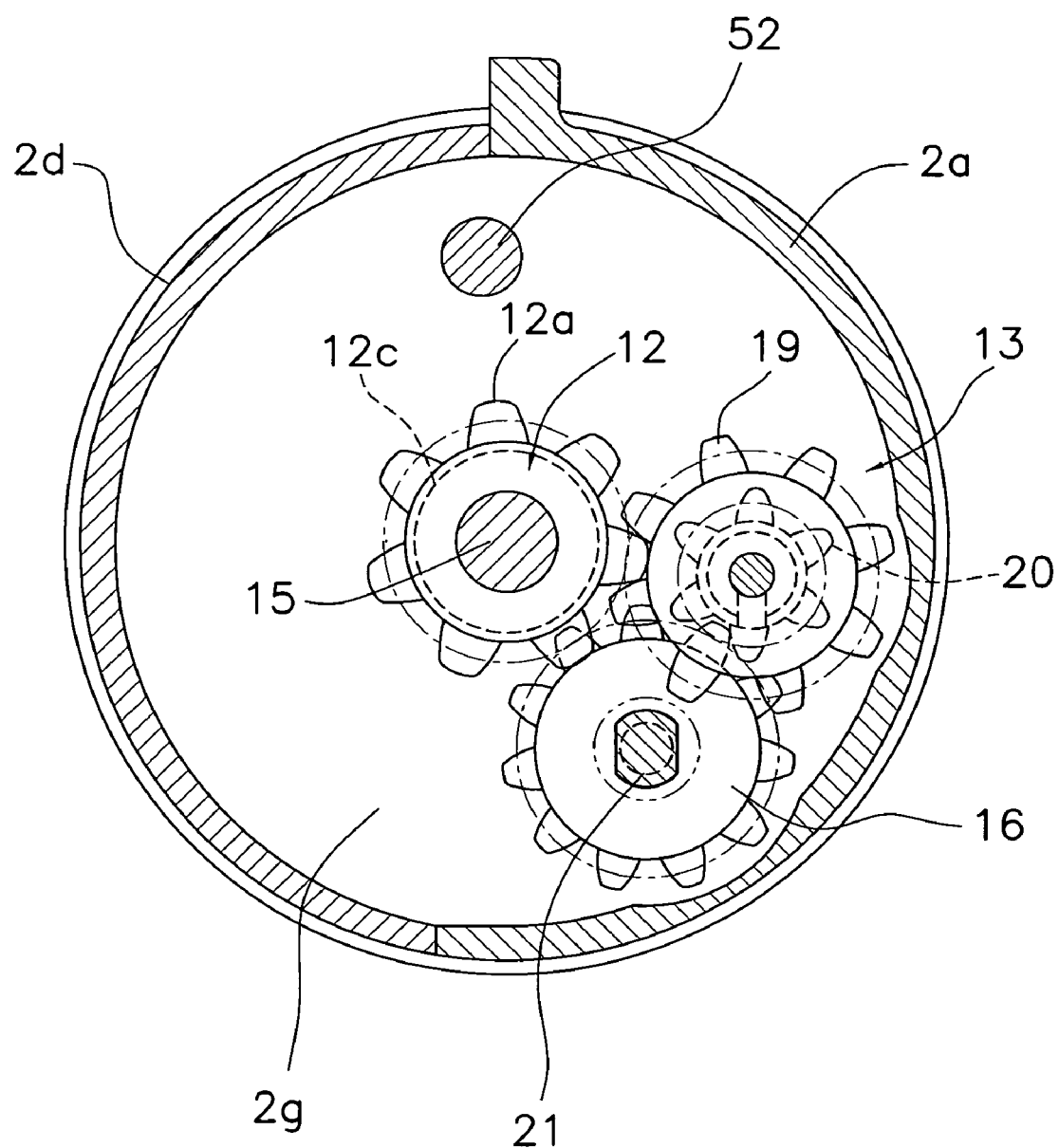
FIG. 5 is a cross-sectional view of the oscillating mechanism of the spinning reel according to the embodiment of the present invention, taken along line V—V in FIG. 4.

The oscillating mechanism 6 reciprocates the spool 4 forward and backward via the spool shaft 15 in association with the rotation of the handle 1. As shown in FIGS. 2 and 5, the oscillating mechanism 6 includes a stepped gear 13 that has a large diameter gear 19 and a small diameter gear 20 and is rotatably mounted on the reel unit 2 so that the stepped gear 13 rotates in different axial direction from that of the main gear 11, a driven gear 16 that meshes with the small diameter gear 20, a worm shaft 21 on which the driven gear 16 is non-rotatably mounted, a slider 22 that engages with the worm shaft 21 and moves forward and backward, and the pinion gear 12 noted above.

The stepped gear 13 is provided in order to greatly decelerate the rotation of the pinion gear 12 and transmit this rotation to the driven gear 16. The stepped gear 13 is disposed inside the circular space on the rear side of the wall 2g (left side of FIG. 4). The stepped gear 13 is rotatably supported on a mounting shaft 18 that is mounted on the wall 2g to be parallel with the spool shaft 15. Both ends of the mounting shaft 18 are supported by the wall 2g and a bracket 2h disposed to the rear of the wall 2g. The large diameter gear 19 of the stepped gear 13 is a crossed helical gear that meshes with the gear portion 12a of the pinion gear 12. The gear teeth of large diameter gear 19 are, for example, formed therein after the large diameter gear 19 is stamped, and the large diameter gear 19 includes an oblong engagement hole 19a in the center thereof. The small diameter gear 20 is a helical gear disposed to be concentric with the large diameter gear 19. The small diameter gear 20 is, for example, formed by die-casting. An engagement projection 20a that non-rotatably engages with the engagement hole 19a is formed on the small diameter gear 20 to project toward the large diameter gear 19. The mounting shaft 18 passes through the center of the small diameter gear 20.

Furthermore, both gears 19, 20 are formed separately and are made from different materials. However, both gears 19, 20 may be unitarily formed in order to make the manufacture of the stepped gear 13 easier and improve the specific strength of the small gear 20 relative to that of the large diameter gear 19.

In addition, the cut-out portion 12c is disposed forward of the gear portion 12a. However, the cut-out portion 12c may be disposed to the rear of the gear portion 12a. In this configuration, it is preferable that the small diameter gear 20 be disposed to the rear of the large diameter gear 19 rather than forward thereof.

The driven gear 16 is a helical gear that meshes with the small diameter gear 20, and the outer peripheral portion of the driven gear 16 is disposed inside the cut-out portion 12c of the pinion gear 12. The outer peripheral portion of the driven gear 16 is disposed such that there is a slight gap between it and the bottom portion of the cut-out portion 12c formed as an annular groove.

Thus, by forming the cut-out portion 12c in the pinion gear 12 and disposing the outer peripheral portion of the driven gear 16 inside the cut-out portion 12c, the driven gear 16 and the worm shaft 21 can be brought close to the spool shaft 15, and the reduction ratio can be maintained while compactly arranging the gears in the reel unit 2.

The worm shaft 21 is disposed parallel to the spool shaft 15, and is rotatably supported by the reel body 2a. In addition, spiral intersecting grooves 21a are formed around the outer peripheral portion of the worm shaft 21. As described above, the driven gear 16 is non-rotatably mounted to the tip of the worm shaft 21.

The slider 22 includes a slider unit 25 and an engagement member 26 that is accommodated inside the slider unit 25. The slider unit 25 is guided parallel to the spool shaft 15 by two guide shafts 24a, 24b. The engagement member 26 is rotatably mounted inside the slider unit 25, and the front end of the engagement member 26 meshes with the grooves 21a of the worm shaft 21.

Oscillating mechanisms are conventional components that are well-known in the art. Accordingly, the oscillating mechanism 6 will not be explained or illustrated in further details herein.

Configuration of the Spool 4

Figure 6:
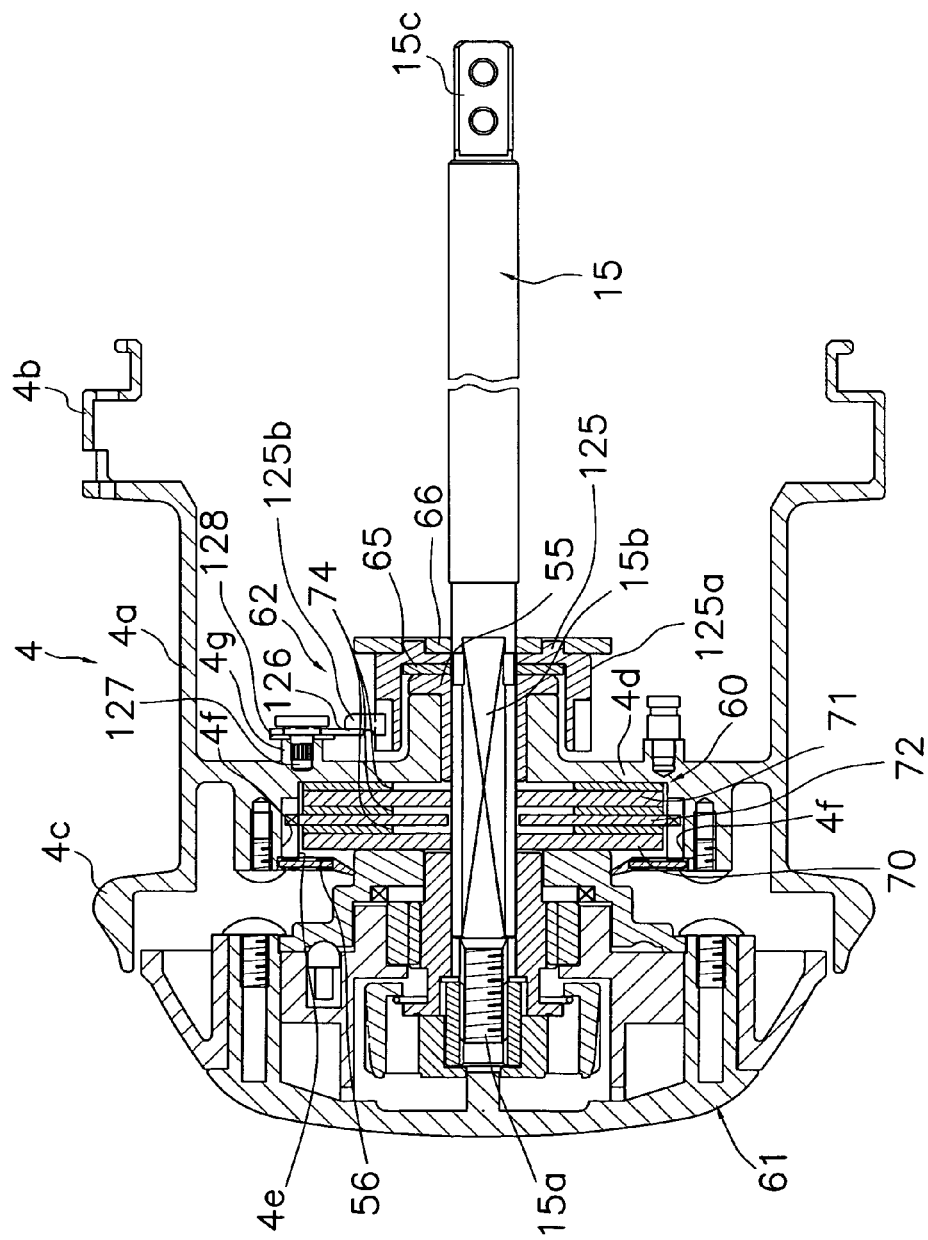
FIG. 6 is a cross-sectional view of a spool that includes a drag mechanism according to the embodiment of the present invention.

The spool 4 is disposed between the first rotor arm 31 and the second rotor arm 32 of the rotor 3, and is rotatably mounted on the front end of the spool shaft 15 such that the rearward movement of the spool 4 is restricted. As shown in FIG. 6, the spool shaft 15 is stepped such that the diameter of the spool 4 gradually shortens toward the front end thereof. The spool shaft 15 includes a first male screw 15a that is formed on a small diameter portion on the front end of the spool shaft 15. The first male screw 15a is a single thread screw. In addition, mutually parallel chamfered portions 15a are provided on the base end sides of the first male screw 15a. The spool shaft 15 includes a slider mounting portion 15c on the base end thereof, on which a slider 22 of the oscillating mechanism 6 is non-rotatably and axially non-movably mounted.

The spool 4 is a member made of, for example, an aluminum alloy, and includes a bobbin 4a around the outer periphery of which fishing line is wound, a large diameter skirt portion 4b unitarily formed with the rear of the bobbin 4a, and a small diameter front flange portion 4c that is unitarily formed with the front of the bobbin 4a. The bobbin 4a is a cylindrical member that extends toward the outer peripheral sides of the cylindrical portion 30 of the rotor 3. The bobbin 4a includes a disk-shaped mounting portion 4d in which a boss portion is formed. The spool shaft 15 is mounted in the inner peripheral side of the boss portion. The mounting portion 4d is rotatably mounted on the spool shaft 15 via a brimmed bush 55. A tubular drag accommodation portion 4e that accommodates a drag mechanism 60 that brakes the spool 4 is formed in the front portion of the mounting portion 4d. A pair of engagement grooves 4f is formed along the axial direction in the inner circumferential surface of the drag accommodation portion 4e.

Spools are conventional components that are well-known in the art. Accordingly, the spool 4 will not be explained or illustrated in further details herein.

Configuration of the Drag Mechanism 60

The drag mechanism 60 brakes the spool 4, and allows the drag force to be adjusted by a drag adjustment knob 61 that screws onto the first male screw 15a of the spool shaft 15. The drag mechanism 60 includes first and second drag washers 70, 71 that are non-rotatably engaged with the chamfered portions 15b of the spool shaft 15, and a third drag washer 72 that is non-rotatably engaged with the engagement grooves 4f of the spool 4. The third drag washer 72 is disposed between the first and the second drag washers 70, 71. Drag disks 74 made, for example, from felt are interposed between the first drag washer 70 and the third drag washer 72, the third drag washer 72 and the second drag washer 71, and the second drag washer 71 and the mounting portion 4d of the spool 4. A seal member 56 is mounted between the drag accommodation portion 4e and the rear end of the outer peripheral portion of the drag adjustment knob 61, and serves to prevent foreign matter such as liquid from entering the drag mechanism 60 from this gap.

Drag mechanisms are conventional components that are well-known in the art. Accordingly, the drag mechanism 60 will not be explained or illustrated in further details herein.

Configuration of the Drag Adjustment Knob 61

Figure 7:
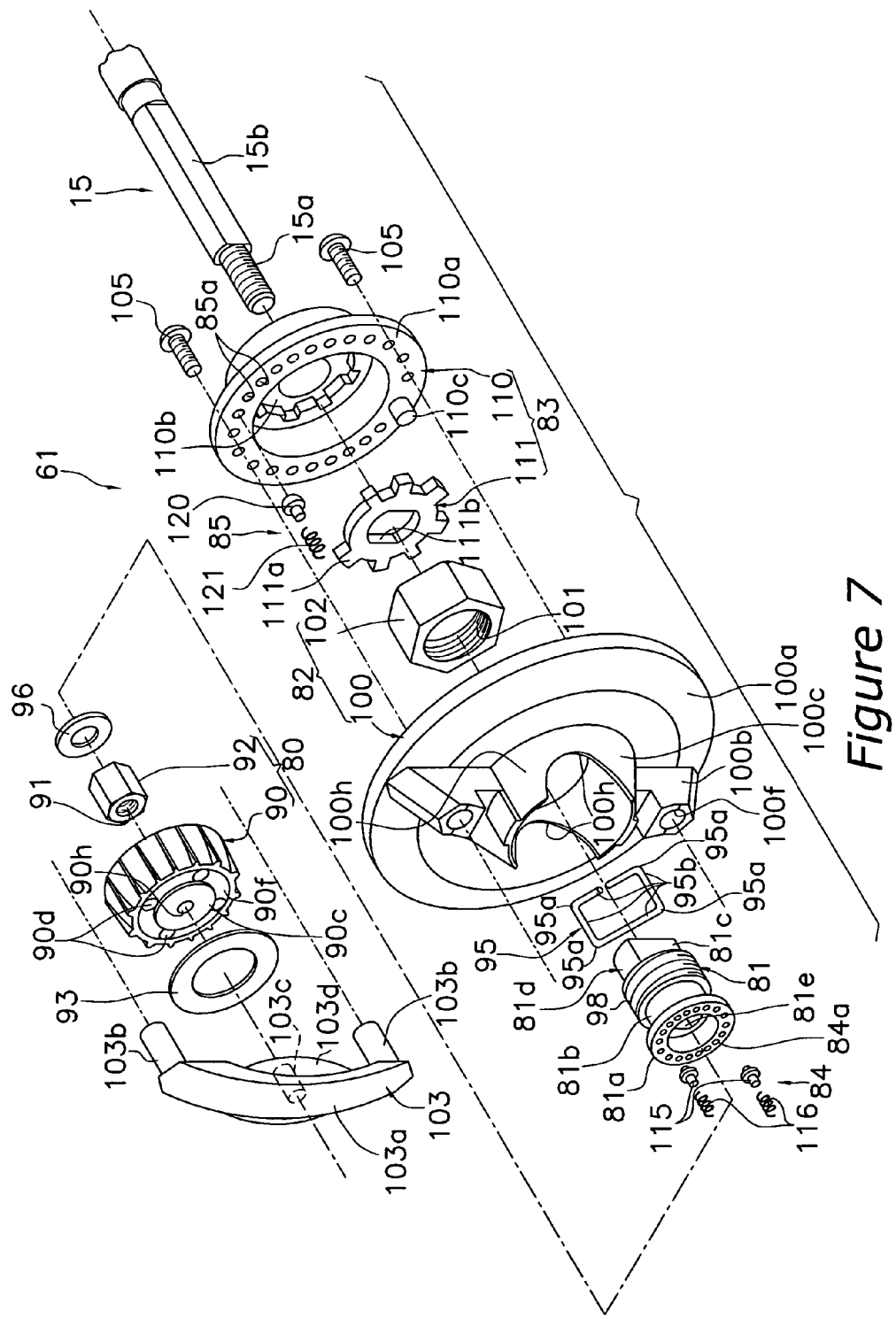
FIG. 7 is an exploded perspective view of a drag adjustment knob according to the embodiment of the present invention.
Figure 8:
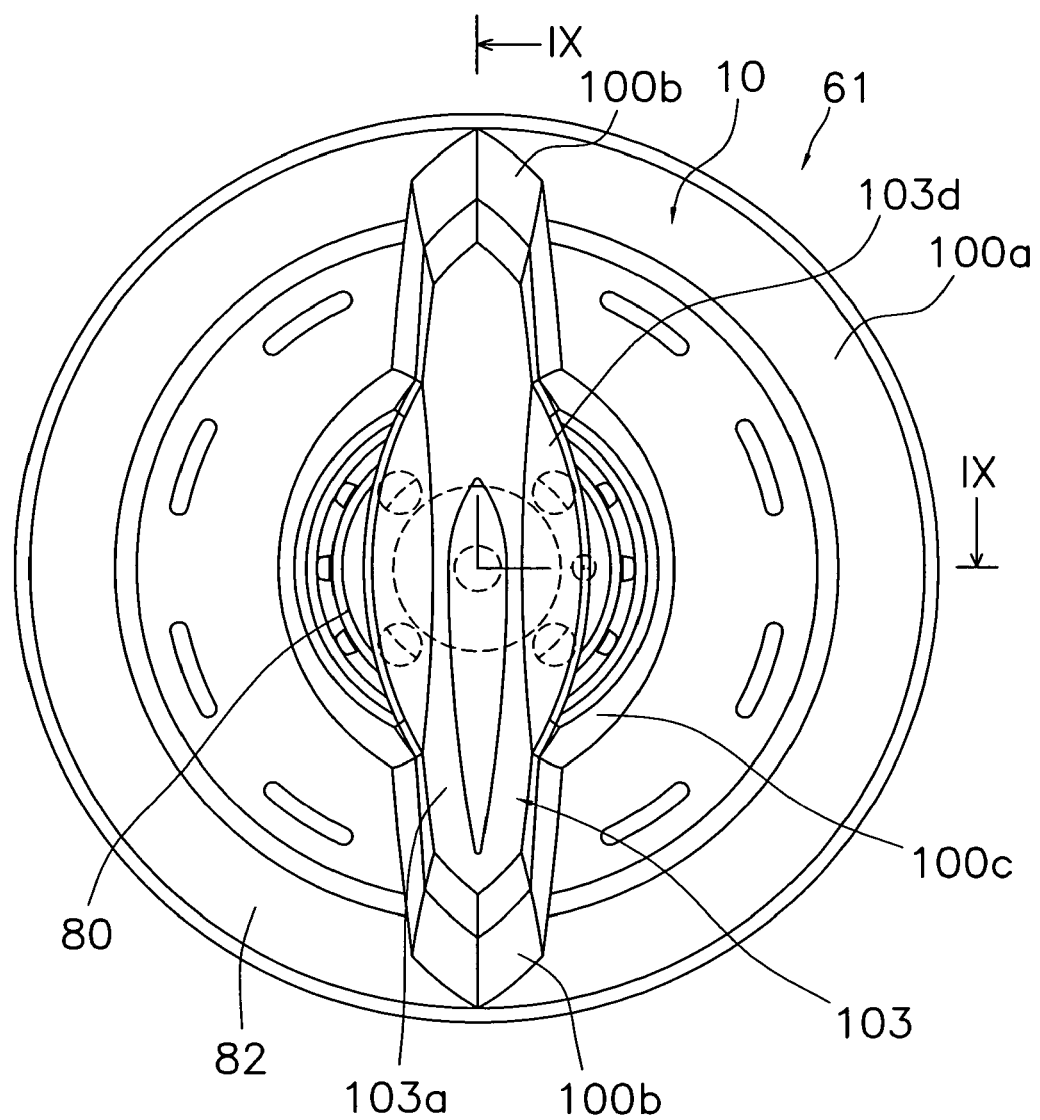
FIG. 8 is a front view of the drag adjustment knob according to the embodiment of the present invention.
Figure 9:
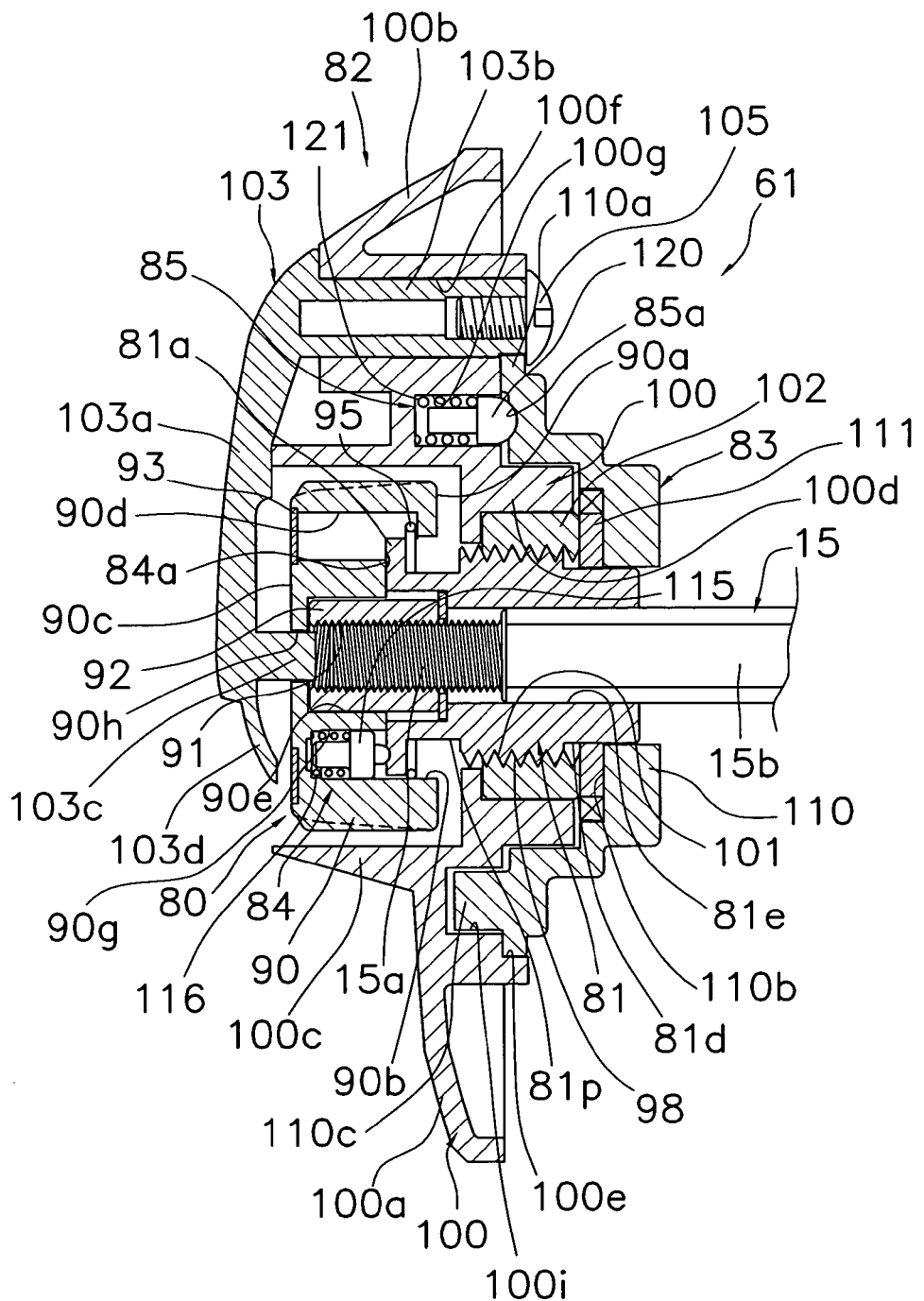
FIG. 9 is a cross-sectional view of the drag adjustment knob according to the embodiment of the present invention, taken along XI—XI in FIG. 8.

As shown in FIGS. 7 to 9, the drag adjustment knob 61 includes a first adjustment unit 80 that includes a first female screw 91 that screws onto the first male screw 15a, a transmission unit 81 that can rotate relative to the first adjustment unit 80, a second adjustment unit 82 that can rotate relative to the transmission unit 81, and a pressing unit 83 that cannot rotate relative to the transmission unit 81. In addition, the drag adjustment knob 61 includes a first knob sound generating portion 84 that generates sound through relative rotation between the first adjustment unit 80 and the transmission unit 81, and a second knob sound generating portion 85 that generates sound through relative rotation between the second adjustment unit 82 and the pressing unit 83.

The first adjustment unit 80 includes a first adjustment unit body 90, and a first nut 92 in which the first female screw 91 is formed on the inner peripheral surface thereof.

The first adjustment unit body 90 serves to rotate the first adjustment unit 80. The first adjustment unit body 90 includes a circular transmission unit accommodation recess 90b, and, for example, four engagement grooves 90d. The transmission unit accommodation recess 90b is formed in a rear end surface 90a to be open and concentric with the axis of the spool shaft 15. The engagement grooves 90d are formed from a front end surface 90c which is a surface on the other side of the rear end surface 90a, past the outer edge of the transmission unit accommodation recess 90b through the rear end surface 90a, and are spaced apart in the circumferential direction and formed in a circular shape along the axial direction. A retaining spring 95 (described below, an example of first retaining portion) is mounted in the engagement grooves 90d. A first nut accommodation portion (first recess) 90e is formed in the inner peripheral portion of the tubular first adjustment unit body 90, and serves to prevent the rotation and the forward movement of the first nut 92. In addition, a shallow ring groove 90f is formed in the front end surface of the first nut accommodation portion 90 where the engagement grooves 90d are open, and a plate seal 93 that covers the open portions of the engagement grooves 90d is adhered to the ring groove 90f. Covering the open portions with this type of plate seal 93 will both prevent foreign matter such as liquid from entering or adhering, and improve the exterior appearance of the spinning reel. In addition, circular pin accommodation recesses 90g are formed in two locations diametrically opposed to each other in the bottom surface of the transmission unit accommodation recess 90b of the first adjustment unit body 90, and serve to accommodate the first knob sound generating portion 84. Furthermore, a central hole 90h is formed in the center of the front surface of the first nut accommodation portion 90.

The first nut 92 is hexagonal, and has the first female screw 91 formed in the inner peripheral surface thereof. The first nut 92 is mounted in the first nut accommodation portion 90e of the first adjustment unit body 90 so as to be prevented from rotating and moving in the forward direction. The first nut 92 contacts with the transmission unit 81 retained in the first adjustment unit 90 via a washer 96. Because of this, the first nut 92 is interposed between the first adjustment unit body 90 and the transmission unit 81.

The transmission unit 81 is in contact with the rear of the first adjustment unit 80, and mounted on the spool shaft 15 to be non-rotatable but movable in the axial direction. The transmission unit 81 is a substantially tubular member that includes on the outer periphery thereof a second male screw 98 having a different screw lead from that of the first made screw 15a. The transmission unit 81 includes a large diameter first brim 81a on the front end portion thereof. The outer diameter of the first brim 81a is smaller that the inner diameter of the transmission unit accommodation recess 90b of the first adjustment unit body 90, and the first brim 81a can be inserted into the transmission unit accommodation recess 90b. The front end surface of the first brim portion 81a is in contact with the bottom surface of the transmission unit accommodation recess 90b. In addition, a plurality of sound producing recesses 84a that make up the first knob sound generating portion 84 are formed spaced apart in the circumferential direction in the front end surface of the first brim portion 81a. A second male screw 98 is formed to the rear of the first brim portion 81a and separated from the first brim portion 81a across a gap. The second male screw 98 is a double thread screw that has a pitch larger than the first male screw 15a. Because of this, the lead of the second male screw 98 is larger than the lead of the first male screw 15a. A small diameter retaining recess 81b is formed between the first brim portion 81a and the second male screw 98. The retaining recess 81b is provided in order to mount the retaining spring 95. A rotation engagement portion 81d having mutually parallel chamfered portions 81c is provided at the rear of the second male screw 98. The rotation engagement portion 81d is provided in order to mount the pressing unit 83 so that the pressing unit 83 is non-rotatable and movable in the axial direction. In addition, an engagement hole 81e that is elliptically shaped in cross-section and non-rotatably engages with the chamfered portions 15b of the spool shaft 15 is formed in the inner peripheral surface of the transmission unit 81.

The retaining spring 95 is a metal wire member bent into a curved shape. The retaining spring 95 can be mounted from the open side of the transmission unit accommodation recess 90b in order to rotatably retain the transmission unit 81 in the first adjustment unit 80. The retaining spring 95 includes engagement portions 95a composed of corner portions that are engaged with the four engagement grooves 90d in a state in which its rearward its movement is restricted, and contact portions 95b that are unitarily formed with the engagement portions 95a and contact with the rear surface of the first brim portion 81a of the transmission unit 81 from the open side of the transmission accommodation recess 90b to restrict rearward movement of the first brim portion 81a. Here, the structure that serves to engage the retaining spring 95 can be formed by a circular die, and thus the engagement structure of the retaining spring 95 can be achieved without machining and machining costs can be reduced.

The second adjustment unit 82 includes a disk-shaped second adjustment unit body 100, a second nut 102 that includes a second female screw 101 that screws onto the second male screw 98, and a knob portion 103 that is fixedly coupled to the front surface of the second adjustment unit body 100.

The second adjustment unit body 100 includes a knob body 100a, a pair of knob connectors 100b that project forward from the knob body 100a, and a cover portion 100c that projects on the knob body 100a in a tapered tubular shape between the knob connectors 100b. In addition, the second adjustment unit body 100 includes a tubular second nut accommodation portion 100d that projects rearward from the knob body 100a, and a pressing unit accommodation recess (second recess) 100e that projects rearward on the outer peripheral side of the second nut accommodation portion 100d.

The knob body 100a is a plate shaped portion that has a through hole formed in the central portion thereof. The knob connectors 100b project diagonally forward toward the approximate center from diametrically opposing end portions of the knob body 100a. Through holes 100f that serve to mount the knob portion 103 are formed in the knob connectors 100b, and the knob portion 103 is screwed onto the knob connectors 100b and fixedly attached to the knob body 100a. In addition, a circular pin accommodation recess 100g that serves to accommodate the second knob sound generating portion 85 is formed in the rear surface of knob body 100a. The cover portion 100c is formed such that its tubular portion (cover body portion) 100h covers and partially exposes the periphery of the first adjustment unit body 90 of the first adjustment unit 80 at the same time. More specifically, the periphery of the first adjustment unit body 90 is partially exposed by forming a pair of cut-out portions 100h on opposing positions of the periphery of the tapered tubular portion 100h. The first adjustment unit 80 can be pressed and rotated at the exposed portion thereof. The second nut accommodation portion 100d prevents the second nut 102 from rotating and moving forward. A second brim portion 110a (described above) of the pressing unit 83 is rotatably accommodated in the pressing unit accommodation recess 100e. In addition, a C-shaped rotation restriction groove 100i is formed on the inner peripheral side of the pressing unit accommodation recess 10e to be concentric with the axis of the spool shaft 15, and serves to restrict the rotation of the second adjustment unit 82 to within an approximate 330 degree range. In other words, the second adjustment unit 82, which has the second female screw 101 that has a greater screw lead than that of the first female screw 91, the rotation of the second adjustment unit 82 is limited to a range less than 360 degrees.

The second nut 102 is hexagonal, and has the second female screw 101 formed in the inner peripheral surface thereof. The second nut 102 is mounted in the nut accommodation portion 100d of the second adjustment unit body 100 in a state in which the second nut 102 is prevented from rotating and moving in the forward direction. The second nut 102 is in contact with the pressing unit 83 retained on the second adjustment unit 82. Because of this, the second nut 102 is interposed between the second adjustment unit body 100 and the pressing unit 83.

The knob portion 103 serves to rotate the second adjustment unit 82. The knob portion 103 includes a bridge portion 103a that extends in a straight line on the second adjustment unit body 100, a pair of attachment cylinders 103b that extend rearward from the bridge portion 103a, a shaft portion 103c that extends rearward from the center of the bridge portion 103a and is inserted into the central hole 90h of the first adjustment unit body 90, and a wide portion 103d that spreads out into a bowl shape from the central portion of the bridge portion 103a. The pair of attachment cylinders 103b passes through the through holes 10f. Screws 105 are screwed into the rear end surface of the attachment cylinders 103b to fixedly couple the knob portion 103 to the second adjustment unit body 100. The bridge portion 103a and the wide portion 103d partially cover the front end surface of the first adjustment unit body 90 of the first adjustment unit 80. Here, by partially covering the front end portion of the first adjustment unit 80, it will be difficult for fishing line to become snagged on the first adjustment unit 80. In addition, because one portion of the periphery of the first adjustment unit 80 is exposed and another portion thereof is covered with the cover portion 100c, it will be possible to operate the first adjustment unit 80 with the exposed portion while it is difficult for fishing line to become snagged on the first adjustment unit 80.

The pressing unit 83 is disposed between the second adjustment unit 82 and the drag mechanism 60 and in contact with both, and is non-rotatable with respect to the spool shaft 15 but movable in the axial direction. The pressing unit 83 includes a disk-shaped pressing unit body 110 that has a second brim portion 110a, and a toothed washer 111 that serves to non-rotatably link the pressing unit body 110 with the transmission unit 81 non-rotatably mounted to the spool shaft 15.

The pressing unit body 110 is rotatably mounted on the transmission unit 81, and includes the second brim portion 110a whose outer peripheral edge is accommodated in the pressing unit accommodation recess 100e. The second brim portion 110a is rotatably retained on the second adjustment unit body 100 by two screws 105 that serve to fix the knob 103 to the second adjustment unit body 100. An engagement recess 110b that non-rotatably engages with the toothed washer 111 is formed in the inner peripheral portion of the pressing unit body 110. In addition, a restriction projection 110c that engages with the rotation restriction groove 100i projects forward on the front end surface of the second brim portion 110a. The rotational range of the second adjustment unit 82 is restricted by engaging the restriction projection 110c with the rotation restriction groove 100i. Thus, the set value of the drag force can be easily changed by restricting the rotational range. Furthermore, a plurality of sound producing recesses 85a that make up the second knob sound generating portion 85 are formed spaced apart in the circumferential direction in the front end surface of the second brim portion 110a, except where the restriction projection 110c is formed.

The toothed washer 111 is provided in order to make the pressing unit body 110 non-rotatable with respect to the spool shaft 15. More specifically, the toothed washer 111 is non-rotatably mounted to the transmission unit 81 that is non-rotatable with respect to the spool shaft 15, thereby making the pushing unit 83 non-rotatable with respect to the spool shaft 15. The toothed washer 111 includes a plurality of engagement teeth 11a that are formed in a spaced relationship in the circumferential direction on the outer periphery thereof and project radially outward. The engagement teeth 11a are spaced apart with a uniform gap, except that one tooth is missing. This allows the pressing unit 83 to be placed in a predetermined rotational displacement with respect to the second adjustment unit 82. An oblong shaped engagement hole 111b that non-rotatably engages with the rotation engagement portion 81d of the transmission unit 81 is formed in the inner peripheral surface of the toothed washer 111. The engagement hole 111b is formed with a predetermined rotational displacement with respect to the engagement teeth 111a.

The first knob sound generating portion 84 includes sound producing recesses 84a that are formed in the transmission unit 81, two sound producing pins 115 that are accommodated in two pin accommodation recesses 90g and that can extend toward and retract away from the sound producing recesses 84a, and sound producing springs 116 that urge the sound producing pins 115 toward the sound producing recesses 84a.

The second knob sound generating portion 85 includes sound producing recesses 85a that are formed in the brim portion 110a, a sound producing pin 120 that is accommodated in the pin accommodation recess 100g and that can extend toward and retract away from the sound producing recesses 85a, and a sound producing spring 121 that urges the sound producing pin 120 toward the sound producing recesses 85a.

The diameter of the head portions of the sound producing pins 115 of the sound generating portion 84 is smaller than the diameter of the head portion of the sound producing pin 120 of the sound generating portion 85. In addition, the gap between the sound producing recesses 84a is narrower than the gap between the sound producing recesses 85a. Because of this, the first knob sound generating portion 84 will produce finer clicking sounds than those of the second knob sound generating portion 85.

In addition, as shown in FIG. 6, a drag sound generating portion 62 that generates sound when the drag mechanism 60 operates and the spool 4 rotates with respect to the spool shaft 15 is disposed to be in sliding contact with the rear of the spool 4. As shown in FIG. 6, the drag sound generating portion 62 includes a sound producing member 125 that is mounted to the rear surface of the brim portion of the brimmed bush 55 via a washer 65, a closed-end tubular sound producing claw 126 that is pivotably mounted on the spool 4 and capable of contacting the sound producing member 125, and a coil spring (not shown in the figures) that urges the sound producing claw 126 to a position that contacts with the sound producing member 125. The sound producing member 125 is rotatably mounted on the spool shaft 15. The sound producing member 125 is non-rotatably engaged with a spool washer 66 that is non-rotatably mounted on the rear end portion of the chamfered portion 15b of the spool shaft 15 in a state in which rearward movement of the spool washer 66 is restricted. This allows the sound producing member 125 to be non-rotatable with respect to the spool shaft 15. Note that the spool washer 66 restricts rearward movement of the spool 4 via the sound producing member 125 and the washer 65. The sound producing member 125 includes a sound producing cylinder 125a whose outer periphery is disposed on the outer periphery of the boss portion of the mounting portion 4d of the spool 4, and a plurality of sound producing projections 125b that are formed spaced apart in the circumferential direction on the outer peripheral surface of the sound producing cylinder 125a.

The sound producing claw 126 is pivotably supported by a pivot pin 127 press fitted into the end surface of a mounting cylinder 4g. The mounting cylinder 4g is formed into a cylindrical shape to project rearward on the mounting portion 4d of the spool 4. A washer 128 is interposed between the sound producing claw 126 and the end surface of the mounting cylinder 4g. By interposing the washer 128 in this manner, the sound producing claw 126 can be supported by the washer 128 such that the sound producing claw 126 will not oscillate in a direction perpendicular to the pivot direction, and it will no longer be necessary to provide a surface that supports the sound producing claw 126 on the mounting cylinder 4g. Because of this, the thickness of the mounting cylinder 4g in the radial direction can be reduced, and thus the weight of a spool 4 forged from aluminum can be reduced.

Operation and Function of the Reel

With this spinning reel, the drag force thereof will be adjusted before engaging in fishing in accordance with the fishing method and the type of fish that one is attempting to catch. When the drag force is to be adjusted, the first adjustment unit 80 is first rotated, and the initial drag force is set. When the first adjustment unit 80 rotates in the screw tightening direction, the first nut 92 moves rearward to press the drag mechanism 60 via the transmission unit 81, the second nut 102, and the pressing unit 83, and the drag force increases thereby. When the first adjustment unit 80 is rotated in the opposite direction, the drag force will be reduced. When this occurs, the initial drag can be precisely set because the first male screw 15a and the first female screw 91 are single thread screws having a fine pitch.

When the initial drag force has been set, the second adjustment unit 82 is rotated to set the usual drag force used when a fish has been caught. When the second adjustment unit 82 rotates in the screw tightening direction, the second nut 102 moves rearward to press the drag mechanism 60 via the pressing unit 83, and the drag force increases thereby. When this occurs, the second nut 102 moves more rearward in response to the rotation of the second adjustment unit 82 than compared to the case where the first nut 92 is rotated because the second male screw 98 and the second female screw 101 are double thread screws and have a broad pitch. Since the first female screw 91 is a single thread screw, the second female screw 101 has a greater screw pitch and a greater number of threads than the first female screw 91. Thus, the drag force can be significantly changed simply by moving the second adjustment unit 82 by a small distance.

Here, even if the pitches are the same in the double thread screws of the second adjustment unit 82 and the single thread screws of the first adjustment unit 80, the amount of rearward movement with respect to the amount of rotation of the second adjustment unit 82 that employs double thread screws will be several times greater than that of the first adjustment unit 80 that employs single thread screws. Moreover, because the double thread screws are employed, it is possible to make both the pitch and the number of engaged threads be the same in the adjustment unit that employs single thread screws and the adjustment unit that employs double thread screws. Because of this, there will no longer be any need to increase the screw pitch, and the strength of the screws can be maintained and the desired drag force can be quickly set.

When casting with this spinning reel, the bail arm 44 is pushed over from the line-winding posture to the line-releasing posture. Then, the fishing rod is swung and the tackle is cast out. When this occurs, fishing line is released in a helical fashion from the front of the spool 4. At this point, there is little release resistance because the fishing line is densely wound onto the spool 4.

When the fishing line is to be wound onto the spool 4, the bail 44 is returned to the line retrieving posture. This is performed automatically by a cam and a spring (not shown in the figures) when the handle 1 is rotated in the line winding direction. When the handle 1 is rotated in the line winding direction, rotational force is transmitted to the pinion gear 12 via the main gear shaft 10 and the main gear 11. The rotational force transmitted to the pinion gear 12 is transmitted to the rotor 3 via the front portion of the pinion gear 12, and the rotor 3 rotates in the line winding direction.

Meanwhile, the stepped gear 13 is rotated by the large diameter gear 19 that meshes with the pinion gear 12, and this rotation is transmitted to the driven gear 16 via the small diameter gear 20. As a result, the worm shaft 21 rotates at the rotational speed of the pinion gear 12, i.e., a rotation speed that is less than the rotational speed of the rotor 3. The rotation of the worm shaft 21 causes the slider 22 that meshes with the grooves 21a of the worm shaft 21 to move forward and backward, guided by the guide shafts 24a and 24b. The fishing line guided by the bail arm 44 to the spool 4 is wound onto the bobbin 4a of the spool 4, and the fishing line is densely wound onto the spool 4. Because of this, fishing line is wound onto the spool 4 more efficiently.

In addition, the pinion gear 12 includes the cut-out portion 12c that is cut out in the circumferential direction with a diameter that is smaller than that of the gear portion 12a, and the outer peripheral portion of the driven gear 16 can be disposed in the cut-out portion 12c. Thus, even if the accommodation space of the reel unit 2 is small, the reduction ratio can be maintained, and various gears can be compactly arranged in the reel unit 2, by disposing the driven gear 16 having the same reduction ratio in the cut-out portion 12c.

Other Embodiments

Figure 10:
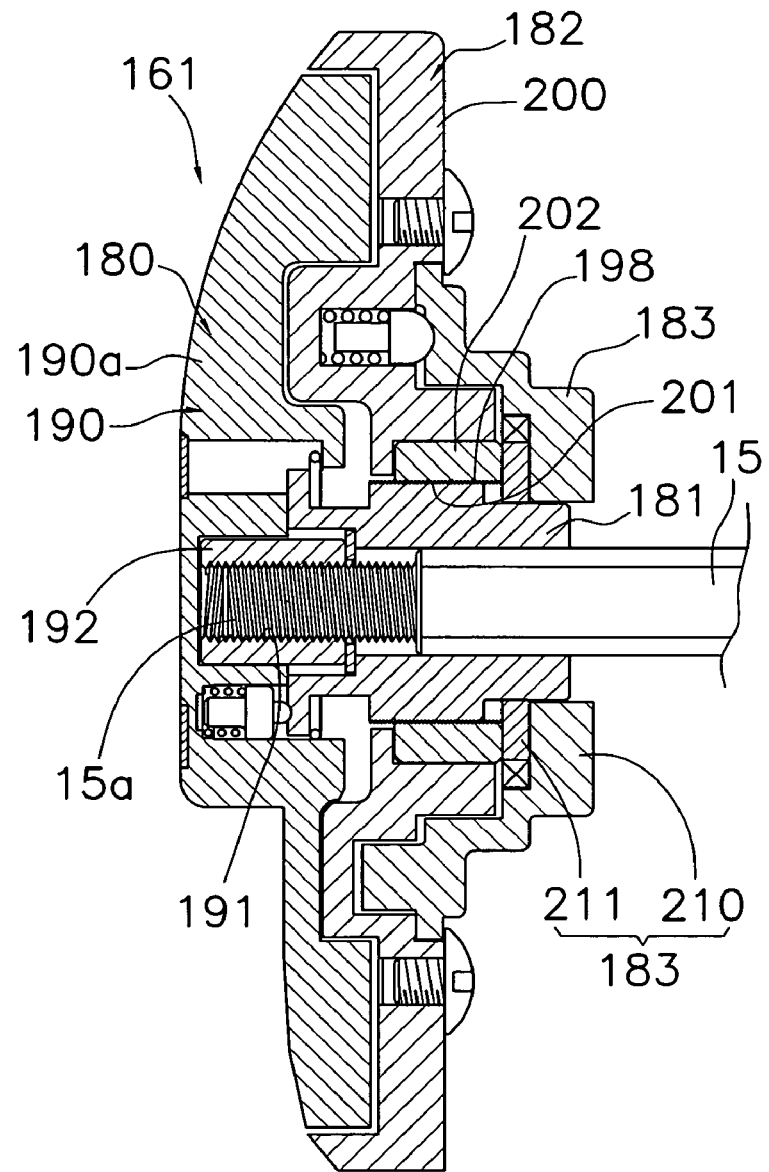
FIG. 10 is a cross-sectional view of the drag adjustment knob corresponding to FIG. 9, according to another embodiment of the present invention.

Referring now to FIG. 10, a drag adjustment knob in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the foregoing embodiment, the initial drag force is precisely set with the first adjustment unit and the usual drag force is set with the second adjustment unit, but the reverse is also possible. In other words, the second adjustment unit may have single thread screws and the first adjustment unit may have double thread screws.

In FIG. 10, a drag adjustment knob 161 includes a first adjustment unit 180, a transmission unit 181, a second adjustment unit 182, and a pressing unit 183.

The first adjustment unit 180 includes a disk-shaped first adjustment unit body 190 having a projection 190a that extends in a straight line on the front surface thereof, and a first nut 192 that is non-rotatably mounted in the interior of the first adjustment unit body 190 in a state in which forward movement is restricted. The first male screw 15a on the front end of the spool shaft 15 is a double thread screw, and a first female screw 191 on a first nut 192 that screws onto the first male screw 15a is also a double thread screw.

The transmission unit 181 is rotatably retained on the first adjustment unit body 190. A description of the retaining structure is omitted because it is the same as that of the aforementioned embodiment. A second male screw 198 formed in the outer peripheral surface of the transmission unit 181 is a single thread screw having the same pitch as that of the first male screw 15a.

The second adjustment unit 182 is a disk-shaped member that is formed on the rear surface of the first adjustment unit 180 to have a large diameter that covers the outer peripheral surface of the first adjustment unit 180. The second adjustment unit 182 includes a disk-shaped second adjustment unit body 200, and a second nut 202 having a second female screw that is screwed onto the second male screw 198. The second adjustment unit body 200 has the same configuration as that of the aforementioned embodiment, with the exception of the shape thereof.

The pressing unit 183 includes a disk-shaped pressing unit body 210, and a toothed washer 211 that serves to non-rotatably link the pressing unit body 210 with the transmission unit 181 that is non-rotatably mounted on the spool shaft 15.

With a drag adjustment knob 161 having this type of configuration, when the initial drag force is to be set, the outer peripheral surface, for example, of the second adjustment unit 182 is rotated to adjust the drag force and not the first adjustment unit 180. In addition, the projecting portion 190a is pushed down and the first adjustment unit 180 is rotated when the normal drag force is to be set. Even with this embodiment, the same effects as in the foregoing embodiment will be obtained.

(b) In the aforementioned embodiment, the transmission unit 81 is retained by the retaining spring 95 and the pressing unit 83 is retained by the screws 105. However, the retaining structure is not limited to a retaining spring or screws. For example, a projection that elastically retains may be provided to retain the first and second adjustment units, the transmission unit, or the pressing unit.

(c) In the aforementioned embodiment, double thread screws were illustrated as the multi-thread screws, but triple or greater thread screws may also be employed as an example of the multi-thread screws.

According to the present invention, even if multi-thread screws employed in one adjustment unit and single thread screws employed in another adjustment unit have the same pitch, the amount of rearward lead movement with respect to the amount of rotation of the adjustment unit that employs the multi-thread screws will be several times greater than the rear lead movement of the adjustment unit that employs single thread screws. Moreover, both the pitch and the number of threads can be the same in the adjustment unit that employs single thread screws and the adjustment unit that employs multi-thread screws. Because of this, there will no longer be any need to increase the screw pitch, and the strength of the screws can be maintained and the desired drag force can be quickly set.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications No. 2003-137329, No. 2003-143818, and No. 2003-346035. The entire disclosure of Japanese Patent Applications No. 2003-137329, No. 2003-143818, and No. 2003-346035 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drag adjustment knob for a spinning reel that adjusts a drag force of a drag mechanism that brakes a spool, the spool being rotatably mounted on a spool shaft such that a rearward movement of the spool relative to the spool shaft is restricted, the spool shaft being movable forward and backward with respect to a reel unit of the spinning reel and having a first male screw portion formed on its front end and, the drag adjustment knob comprising:

a first adjustment unit that includes a first female screw portion that is adapted to screw onto the first male screw portion;

a transmission unit that is adapted to be non-rotatably but axially movably mounted on the spool shaft so as to be in contact with a rear of the first adjustment unit, the transmission unit having a second male screw portion;

a second adjustment unit that includes a second female screw portion that screws onto the second male screw portion; and a pressing unit that is disposed between the second adjustment unit and the drag mechanism so that the pressing unit can come into contact with both the second adjustment unit and the drag mechanism, the pressing unit being non-rotatable but axially movable with respect to the spool shaft;

the number of threads of one of the first and second female screw portions that has a greater screw lead being greater than that of the other of the first and second female screw portions.

2. The drag adjustment knob for a spinning reel as set forth in claim 1, wherein the one of the first and female screw portions that has a larger screw lead also has a larger pitch.

3. The drag adjustment knob for a spinning reel as set forth in claim 1, wherein the second female screw portion is a double thread screw, while the first female screw portion is a single thread screw.

4. The drag adjustment knob for a spinning reel as set forth in claim 1, wherein the second adjustment unit further includes a cover portion, the cover portion that covers, while partially exposing, the first adjustment unit.

5. The drag adjustment knob for a spinning reel as set forth in claim 4, wherein the second adjustment unit further includes a bridge portion that partially covers a front end of the first adjustment unit.

6. The drag adjustment knob for a spinning reel as set forth in claim 4, wherein the cover portion includes a tubular cover body portion that covers a periphery of the first adjustment unit, and a pair of cut-out portions that are formed on opposing positions on the tubular cover body portion and partially expose the periphery of the first adjustment unit.

7. The drag adjustment knob for a spinning reel as set forth in claim 1, further comprising a first retaining portion that retains the transmission unit to the first adjustment unit relatively rotatably.

8. The drag adjustment knob for a spinning reel as set forth in claim 7, wherein the first adjustment unit further includes:
   a tubular first adjustment unit body having a circular first recess formed to open on a rear end surface of the first adjustment unit body, and a plurality of engagement grooves that are formed along the axial direction on a front end surface spaced apart in a circular shape to be partially connected to the first recess, and
   a nut member having the first female screw portion and being mounted in the first recess of the first adjustment unit body such that the nut member is non-rotatable relative to the first adjustment unit body and forward movement of the nut relative to the first adjustment unit body is restricted;
the transmission unit includes a first brim portion that is accommodated in the first recess; and
the first retaining portion is an elastic spring member that is mounted to the first recess in order to retain the transmission unit and includes:
   a plurality of engagement portions that are engaged in the plurality of engagement grooves, and contact portions that are unitarily formed with the engagement portions, the contact portions contacting the first brim portion of the transmission unit.

9. The drag adjustment knob for a spinning reel as set forth in claim 1, further comprising
a second retaining portion that retains the pressing unit to the second adjustment unit such that the pressing unit is rotatable relative to the second retaining portion.

10. The drag adjustment knob for a spinning reel as set forth in claim 9, wherein
the second adjustment unit further includes a cover portion having a second recess that is open on a rear end surface of the cover portion;
the pressing unit includes a second brim portion that is accommodated in the second recess; and
the second retaining member is a screw member that engages the second brim portion and is screwed onto the second adjustment unit.

11. The drag adjustment knob for a spinning reel as set forth in claim 1, further comprising
a first sound generating portion that generates sound through relative rotation between the first adjustment unit and the transmission unit.

12. The drag adjustment knob for a spinning reel as set forth in claim 11, further comprising
a second sound generating portion that generates sound through relative rotation between the second adjustment unit and the pressing unit.

13. The drag adjustment knob for a spinning reel as set forth in claim 12, wherein
the first sound generating portion generates clicking sounds having a finer pitch than those generated by the second sound generating portion.

14. The drag adjustment knob for a spinning reel as set forth in claim 1, wherein
one of the first and second adjustment units that has a screw with a larger screw lead has a range of rotation that is limited to less than 360 degrees.

15. The drag adjustment knob for a spinning reel as set forth in claim 1, wherein
the first female screw portion is a double thread screw, while the second female screw portion is a single thread screw.

16. A spinning reel, comprising:
a handle;
a reel unit that rotatably supports the handle;
a rotor rotatably supported on front of the reel unit;
a spool rotatably mounted on a spool shaft such that a rearward movement of the spool relative to the spool shaft is restricted, the spool being supported on front of the rotor so as to move forward and backward, the spool shaft being movable forward and backward with respect to a reel unit of the spinning reel and having a first male screw portion formed on its front end and;
a drag mechanism for braking the spool; and
a drag adjustment knob for adjusting drag force of the drag mechanism, the drag adjustment knob being coupled to the first male screw portion of the spool shaft and including
   a first adjustment unit that includes a first female screw portion that is adapted to screw onto the first male screw portion,
   a transmission unit that is adapted to be non-rotatably but axially movably mounted on the spool shaft so as to be in contact with a rear of the first adjustment unit, the transmission unit having a second male screw portion,
   a second adjustment unit that includes a second female screw portion that screws onto the second male screw portion, and
   a pressing unit that is disposed between the second adjustment unit and the drag mechanism so that the pressing unit can come into contact with both the second adjustment unit and the drag mechanism, the pressing unit being non-rotatable but axially movable with respect to the spool shaft;
the number of threads of one of the first and second female screw portions that has a greater screw lead being greater than that of the other of the first and second female screw portions.

17. The spinning reel as set forth in claim 16, wherein
the one of the first and female screw portions that has a larger screw lead also has a larger pitch.

18. The spinning reel as set forth in claim 16, wherein
the second female screw portion is a double thread screw, while the first female screw portion is a single thread screw.

19. The spinning reel as set forth in claim 16, wherein
the second adjustment unit further includes a cover portion, the cover portion that covers, while partially exposing, the first adjustment unit.

20. The spinning reel as set forth in claim 19, wherein
the second adjustment unit further includes a bridge portion that partially covers a front end of the first adjustment unit.

21. The drag adjustment knob for a spinning reel as set forth in claim 19, wherein
the cover portion includes a tubular cover body portion that covers a periphery of the first adjustment unit, and a pair of cut-out portions that are formed on opposing positions on the tubular cover body portion and partially expose the periphery of the first adjustment unit.

22. The spinning reel as set forth in claim 16, further comprising
a first retaining portion that retains the transmission unit to the first adjustment unit relatively rotatably.

23. The spinning reel as set forth in claim 22, wherein
the first adjustment unit further includes:
   a tubular first adjustment unit body having a circular first recess formed to open on a rear end surface of the first adjustment unit body, and a plurality of engagement grooves that are formed along the axial direction on a front end surface spaced apart in a circular shape to be partially connected to the first recess, and a nut member having the first female screw portion and being mounted in the first recess of the first adjustment unit body such that the nut member is non-rotatable relative to the first adjustment unit body and forward movement of the nut relative to the first adjustment unit body is restricted;

the transmission unit includes a first brim portion that is accommodated in the first recess; and the first retaining portion is an elastic spring member that is mounted to the first recess in order to retain the transmission unit and includes:

a plurality of engagement portions that are engaged in the plurality of engagement grooves, and contact portions that are unitarily formed with the engagement portions, the contact portions contacting the first brim portion of the transmission unit.

24. The spinning reel as set forth in claim 16, further comprising a second retaining portion that retains the pressing unit to the second adjustment unit such that the pressing unit is rotatable relative to the second retaining portion.

25. The spinning reel as set forth in claim 24, wherein the second adjustment unit further includes a cover portion having a second recess that is open on a rear end surface of the cover portion;

the pressing unit includes a second brim portion that is accommodated in the second recess; and the second retaining member is a screw member that engages the second brim portion and is screwed onto the second adjustment unit.

26. The spinning reel as set forth in claim 16, further comprising a first sound generating portion that generates sound through relative rotation between the first adjustment unit and the transmission unit.

27. The spinning reel as set forth in claim 26, further comprising a second sound generating portion that generates sound through relative rotation between the second adjustment unit and the pressing unit.

28. The spinning reel as set forth in claim 27, wherein the first sound generating portion generates clicking sounds having a finer pitch than those generated by the second sound generating portion.

29. The spinning reel as set forth in claim 16, wherein one of the first and second adjustment units that has a screw with a larger screw lead has a range of rotation that is limited to less than 360 degrees.

30. The spinning reel as set forth in claim 16, wherein the first female screw portion is a double thread screw, while the second female screw portion is a single thread screw.

* * * * *